United States Patent [19]

Chun

[11] Patent Number: 5,125,759
[45] Date of Patent: Jun. 30, 1992

[54] ADJUSTABLE COMPLIANT ROBOTIC WRIST USING AN ELECTRO-RHEOLOGICAL FLUID

[76] Inventor: Wendell H. Chun, 7439 S. Cody Way, Littleton, Colo. 80123

[21] Appl. No.: 649,896

[22] Filed: Feb. 4, 1991

[51] Int. Cl.⁵ .............................................. F16D 1/00
[52] U.S. Cl. ................................... 403/24; 403/404; 403/291; 403/220; 403/5
[58] Field of Search ............... 403/32, 404, 291, 220, 403/5, 24, 90, DIG. 1

[56] References Cited

U.S. PATENT DOCUMENTS

| | | | |
|---|---|---|---|
| 2,883,131 | 4/1959 | McNally | 403/220 X |
| 3,503,273 | 3/1970 | Haaker et al. | |
| 3,638,973 | 2/1972 | Poletti | 403/90 X |
| 3,904,042 | 9/1975 | Colston | 214/1 CM |
| 4,433,953 | 2/1984 | Muench | 414/735 |

FOREIGN PATENT DOCUMENTS 269189  6/1989  Fed. Rep. of Germany ........ 403/90

OTHER PUBLICATIONS

Cutkosky and Wright, "Position Sensing Wrists for Industrial Manipulators" (Robotics Institute, Carnegie-Mellon University, Jul. 1982).
Cutkosky and Wright, "Active Control of a Compliant Wrist in Manufacturing Tasks", Transactions of the ASME, vol. 108, pp. 36-43 (Feb. 1986).
"Electro-Rheological Fluids", information brochure distributed by American Cyanamid Company, Wayne, N.J.
Duclos, et al., "Fluids That Thicken Electrically", *Machine Design* (Jan. 21, 1988).

*Primary Examiner*—Andrew V. Kundrat
*Attorney, Agent, or Firm*—Dorr, Carson, Sloan & Peterson

[57] ABSTRACT

A robotic wrist employs a plurality of elastomeric containers holding an electro-rheological fluid. An electromagnetic field can be selectively applied across the electro-rheological fluid within these elastomeric containers to selectively control the viscosity of the electro-rheological fluid and thereby control the stiffness of the elastomeric containers. Two sets of elastomeric containers can be used to control both the axial and radial stiffnesses of the wrist. In the preferred embodiment, the elastomeric containers have a hollow spherical shape. An electromagnetic field is created within the containers by applying a voltage between a conductive film on the interior surface of the sphere and second electrode extending through the sphere into the electro-rheological fluid.

24 Claims, 3 Drawing Sheets

ADJUSTABLE COMPLIANT ROBOTIC WRIST USING AN ELECTRO-RHEOLOGICAL FLUID

BACKGROUND OF THE INVENTION

1. Field of the Invention

The present invention relates generally to the field of robotic wrists. More specifically, the present invention discloses a robotic wrist using an electro-rheological fluid to control and adjust the degree of stiffness and compliance of the wrist.

2. Statement of the Problem

Many robotic tasks, including assembly, require local sensing and repositioning of the tool. This repositioning can be attributed to minor variations in the external working environment, such as inconsistent physical dimensions of parts and components. As a result, robotic joints need to be adjustable with "tuneable" stiffness, particularly if the device is to experience a range of tool lengths and payloads. For example, the wrist should be stiff when lifting a heavy load and compliant when doing delicate work.

The prior art contains several examples of robotic arms, manipulators, and joints. The prior art also contains examples demonstrating various uses of electro-rheological fluids. The following are a few examples:

| Inventor | U.S. Pat. No. | Issue Date |
|---|---|---|
| Haaker, et al. | 3,503,273 | Mar. 31, 1970 |
| Colston | 3,904,042 | Sept. 9, 1975 |
| Muench | 4,433,953 | Feb. 28, 1984 |

Cutkosky and Wright, "Position Sensing Wrists for Industrial Manipulators" (Robotics Institute, Carnegie-Mellon University, July 1982).

Cutkosky and Wright, "Active Control of a Compliant Wrist in Manufacturing Tasks", Transactions of the ASME, Volume 108, pages 36–43 (Feb. 1986).

"Electro-Rheological Fluids", informational brochure distributed by American Cyanamid Company, Wayne, N.J.

Duclos, et al., "Fluids That Thicken Electrically", *Machine Design* (Jan. 21, 1988).

Haaker, et al. disclose a wrist joint for mounting the handle and tong means of a remote control master-slave manipulator of the type used by an operator to perform manipulative functions in some area remote from the operator (e.g. on the opposite side of a shielding wall). The device is a two degree of freedom wrist requiring two motors and cables to operate.

Colston discloses another example of a manipulator arm.

Muench discloses an industrial robot having a joint-free arm. The arm is formed as a hollow tube made from a material that will provide a degree of structural rigidity to enable the arm to support a work tool and provide controlled bending of the tube when the hollow interior of the tube is subjected to variations in pressure.

The articles by Cutkosky and Wright discuss compliant robotic wrists. Reinforced elastomeric spheres are used to float the gripper from the manipulator. The four spherical hydraulic actuators behave as adjustable springs by pressurizing the hydraulic fluid. Increasing hydraulic pressure increases stiffness of the wrist. The stiffness of the spheres can be adjusted to project the center of compliance over a range of several inches out from the upper platform of the wrist. Its 5½ degrees of freedom make this device compliant in each direction except axial extension. As force is applied to the end effector, the stiffness monotonically increases. Thus, the wrist is very sensitive to light loads. For heavier loads the sensitivity reduces and the deflections do not become excessive. This approach has the disadvantage of requiring extensive external hydraulic components (i.e. a pump, reservoir, piping, and solenoid control values) to maintain and regulate hydraulic pressure to each of the spheres.

Electro-rheological fluids have the unique property of becoming more viscous or completely solidifying when placed in an electromagnetic field. The effect is extremely rapid, occurring within milliseconds, and is completely reversible. Fluids exhibiting this effect have been known since the late 1940's. These fluids have sometimes been referred to as "electro-viscous" fluids. Early electro-rheological fluids were made by suspending silica gel in a non-conducting oil, or by suspending starch particles in oil. A number of electro-rheological fluids made of liquid suspensions of fine polymer particles in non-conducting oil are commercially available from American Cyanamid Company of Wayne, N.J. The brochure entitled "Electro-Rheological Fluids", distributed by American Cyanamid Company, provides a general discussion of the properties and historical development of electro-rheological fluids. Typical applications for electro-rheological fluids include electrically controlled brakes, clutches, hydraulic valves, actuators, shock absorbers and dampers. Further general discussion of electro-rheological fluids is provided in Duclos, et al., "Fluids That Thicken Electrically", Machine Design (Jan. 21, 1988).

3. Solution to the Problem

None of the prior art references use electro-rheological fluids to adjustably control the stiffness of robotic wrist. This solution dramatically reduces that complexity of the robotic wrist by eliminating the need for the hydraulic components used to maintain and regulate fluid pressurization of the elastomeric spheres in a robotic wrist such as that disclosed by Cutkosky and Wright.

SUMMARY OF THE INVENTION

This invention provides a robotic wrist employing a plurality of elastomeric containers which hold an electro-rheological fluid. An electromagnetic field can be selectively applied across the electro-rheological fluid within these elastomeric containers to selectively control the viscosity of the electro-rheological fluid and thereby control the stiffness of the elastomeric containers. Two sets of elastomeric containers can be used to control both the axial and radial stiffnesses of the wrist. In the preferred embodiment, the elastomeric containers have a hollow spherical shape. An electromagnetic field is created within the containers by applying a voltage between a conductive film on the interior surface of the sphere and second electrode extending through the sphere into the electro-rheological fluid.

A primary object of the present invention is to provide a simplified design for an adjustably compliant robotic wrist without the complexity, expense, and weight associated with hydraulic systems.

Another object of the present invention is to provide a robotic wrist having an adjustable remote center of compliance.

Yet another object of the present invention is to provide a robotic wrist in which the fluid is sealed within elastomeric containers, thereby substantially eliminating the risk of leakage associated with existing hydraulic systems.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Figure 1:
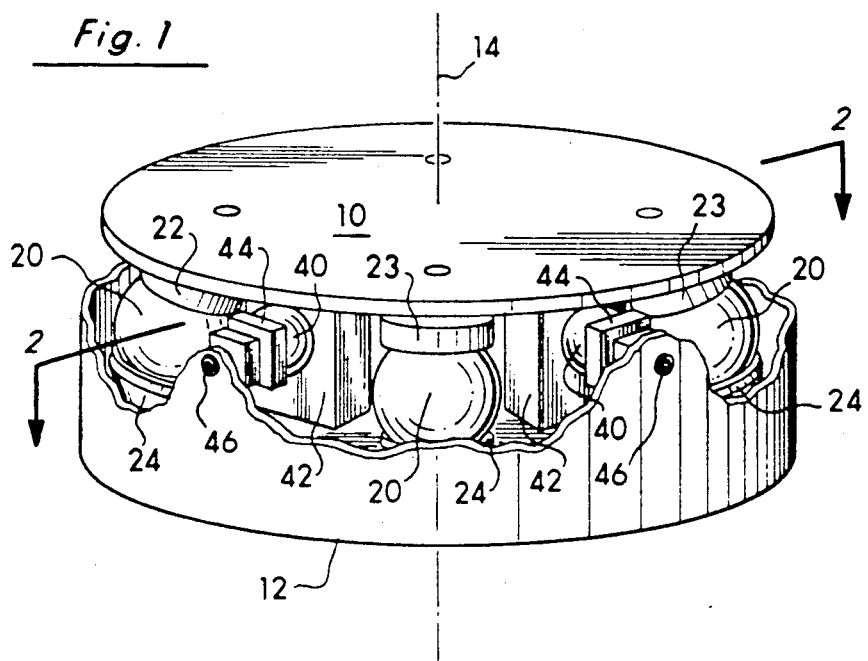
FIG. 1 is a cut-away perspective view of the robotic wrist.

Turning to FIG. 1., a cut-away perspective view of the preferred embodiment of the entire robotic wrist is provided. The wrist is intended to permit a limited degree of relative motion between two members, such as between a robotic arm and pointer, or between a robotic arm and a tool. The upper plate 10 is secured to the end of one member, and the lower plate 12 is secured to the end of the other member. In a typical case, the members have a common central axis 14. As shown in the figures, the plates 10 and 12 are substantially parallel to one another and extend radially outward from the central axis 14.

Figure 5:
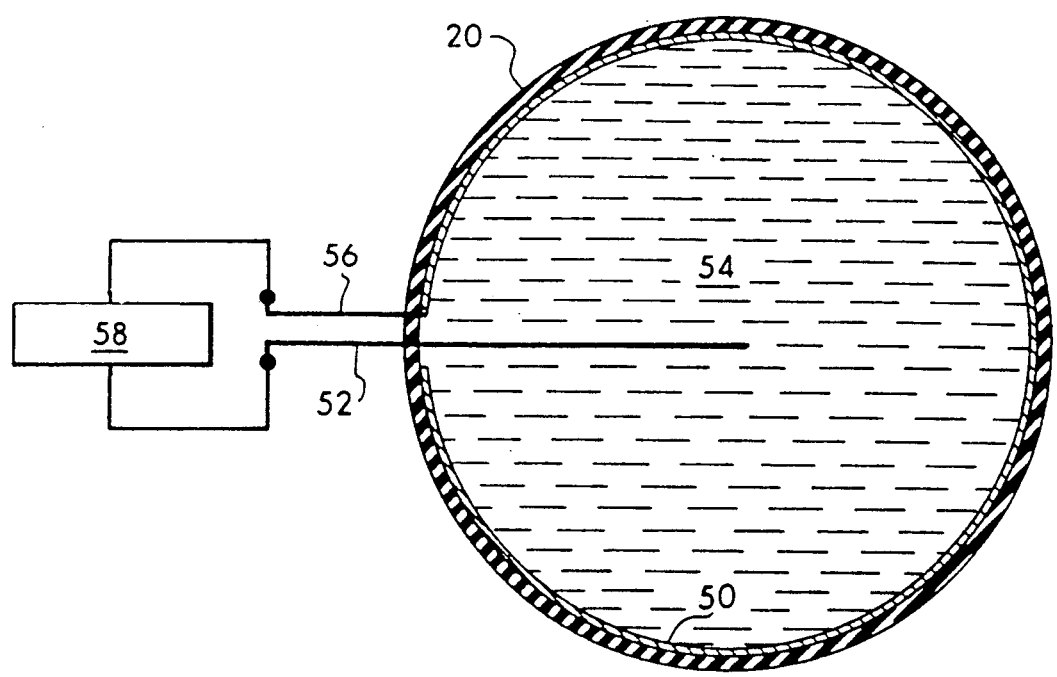
FIG. 5 is a simplified schematic cross-sectional view of one of the elastomeric spheres.

A number of elastomeric containers 20 and 40 separate the plates 10 and 12. These elastomeric containers have a substantially spherical shape with a hollow interior cavity, in the preferred embodiment shown in the cross-sectional view of FIG. 5. Other shapes, such as a cylinder, barrel-shape, or cube, could also be employed. The shell of the container 20 is made of an elastomeric material, such as rubber, and completely encloses the interior cavity. Reinforcing fibers (e.g. Kevlar thread) can be wound around the container for added strength. The interior cavity of the container 20 is filled with an electro-rheological fluid 54, such as one of those commercially available from American Cyanamid Company of Wayne, N.J. Viscosity of the electro-rheological fluid 54 is controlled by creating an electromagnetic field within the container 20. This can be accomplished in any of a number of different ways. In the preferred embodiment, the electromagnetic field is created by imposing a voltage across two electrodes 50 and 52 within the container 20. The first electrode 50 is a conductive film deposited on a substantial portion of the inside surface of the shell of the container 20. An electrical lead 56 extends through the shell of the container 20 to provide an external connection for the first electrode 50. The second electrode 52 is simply a metal pin extending through the shell of the container 20 into the interior cavity filled with electro-rheological fluid 54. The first electrode 50 is not in electrical contact with the second electrode 52. In addition, the electro-rheological fluid 54 is substantially non-conductive. Therefore, when a voltage is applied across the first and second electrodes 50 and 52 (e.g. by means of a voltage source, such as a battery 58), the result is an electromagnetic field between the electrodes that acts upon the entire volume of electro-rheological fluid held within the container 20. The strength of this electromagnetic field, and therefore the viscosity of the electro-rheological fluid, can be controlled by adjusting the voltage applied across the electrodes 50 and 52.

Figure 2:
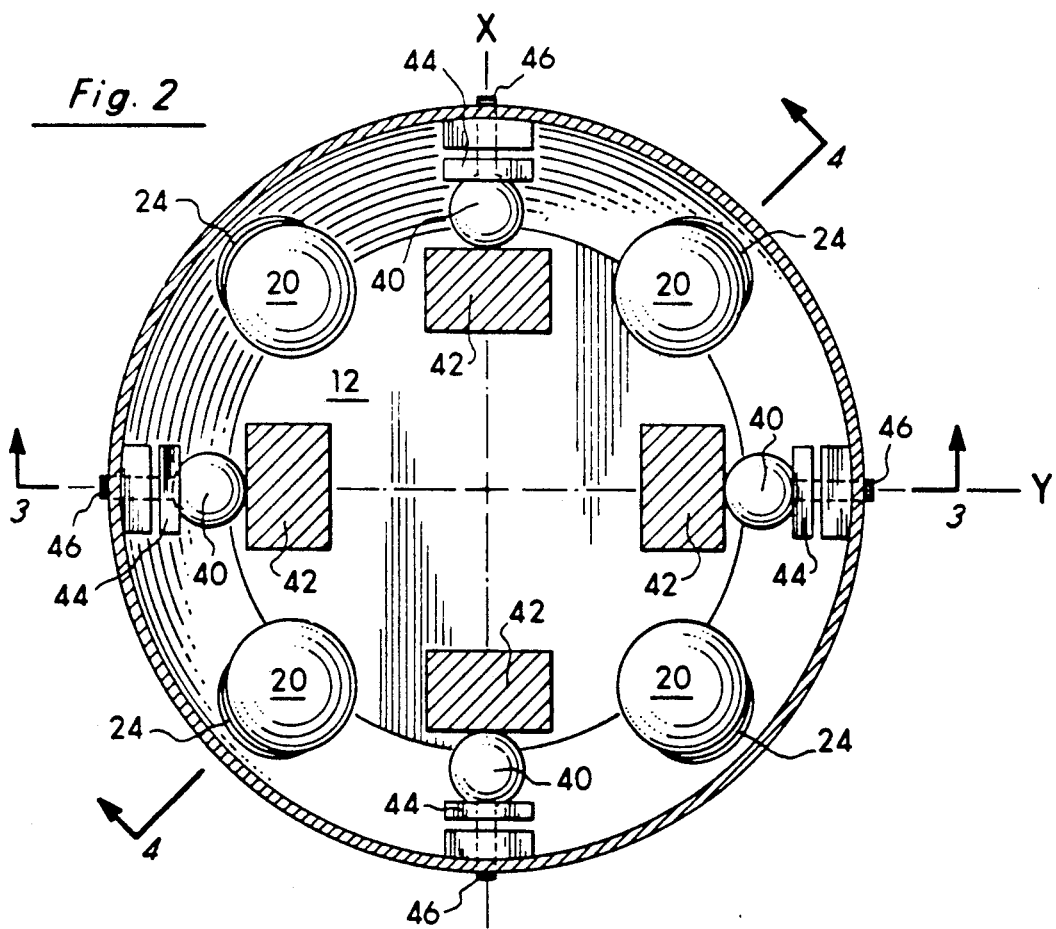
FIG. 2 is a horizontal cross-section view corresponding to the robotic wrist shown in FIG. 1.

Each of the elastomeric containers 20 and 40 shown in FIGS. 1–4 have substantially the same individual structure as described above. However, the axial elastomeric containers 20 provide a function different from that of the radial elastomeric containers 40. The axial containers 20 are positioned between the upper plate 10 and lower plate 12 to constrain axial compression of the plates. The axial containers 20 are typically positioned in a radial arrangement about the central axis 14, as shown in FIG. 2. This arrangement helps to insure that at least one of the axial containers 20 will be in compression for almost any type of loading imposed on the plates 10 and 12. The viscosity of the electro-rheological fluid, and therefore the effective spring constant of these containers 20, can be variably controlled by adjusting the voltage between the electrodes 50 and 52 for each container 20. In the embodiment shown in FIGS. 1–4, each axial container 20 is held between two opposing axial faces, or pods, 22 and 24 attached to the upper and lower plates 10 and 12, respectively. The face of each pod has a substantially spherical indentation to provide a seat for the spherically-shaped container 20. The relative spacing between each pair of pods 22 and 24 can be individually adjusted by means of an adjustment screw 26 to match the diameter of the container 20.

Figure 4:
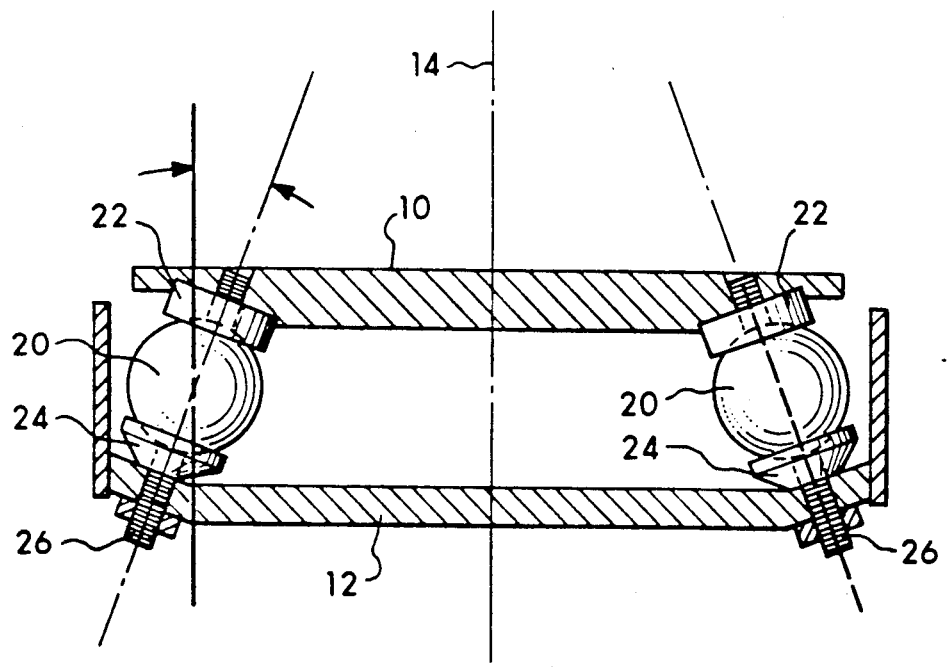
FIG. 4 is another vertical cross-sectional view showing the axial elastomeric spheres.

A degree of inaccuracy in terms of both alignment and dimension is always present in the workpiece and the robotic device. These inherent inaccuracies have been recognized and extensively discussed in the literature in the field. One approach has been to overcome these inaccuracies by developing a passive, position adaptive robotic wrist. For example, Cutkosky and Wright ("Position Sensing Wrists for Industrial Manipulators", supra) provide a detailed mathematical analysis of a "remote center compliance" or "RCC" wrist. This device allows a shaft attached to the wrist to be inserted into a bore by aligning the center of compliance of the wrist with the shaft tip. Undesirable contact between the shaft and bore creates moments and forces but the latter self-minimize in the wrist as the unit changes its orientation. The wrist thus not only allows for inherent error in the manipulator but can also cope with minor, unexpected positional variations in the components arriving for assembly. The RCC design is elegant and inexpensive. In addition, active control may be used in conjunction with an RCC wrist to improve its versatility. The mathematical analysis by Cutkosky and Wright is directly applicable to the present design, and is incorporated herein by reference. As shown in FIG. 4, the axial faces, or pods, 22 and 26 are oriented to hold the axial containers 20 at a small angle of inclination (typically about 20 degrees) with respect to the central axis 14. This angle of inclination permits the center of compliance of the wrist to be moved over a range of several inches by adjusting effective spring constant of the axial containers.

Figure 3:
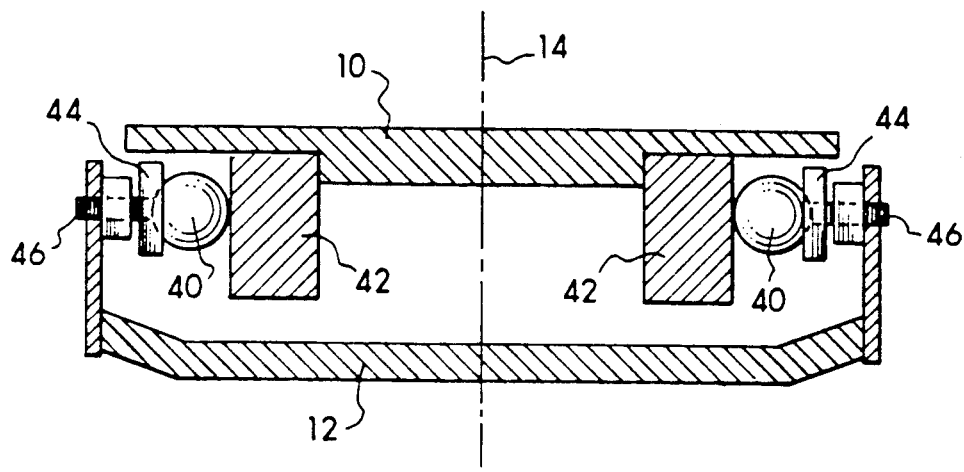
FIG. 3 is a vertical cross-sectional view showing the radial elastomeric spheres.

The radial elastomeric containers 40 constrain radial relative motion between the plates 10 and 12, as shown in FIGS. 2 and 3. Here again, the containers 40 are disposed in a radial arrangement about the central axis 14, to insure that any lateral motion will compress at least one of the radial containers 40. (Lateral relative motion of the plates 10 and 12 will also result in rolling of the axial containers 20.) Each container 40 is held between two opposing radial faces, or pods, 42 and 44 attached to the upper and lower plates 10 and 12, respectively. The face of each pod has a substantially spherical indentation to provide a seat for the spherically-shaped container 40. The relative spacing between each pair of pods 42 and 44 can be individually adjusted by means of an adjustment screw 46 to match the diameter of the container 40. The viscosity of the electro-rheological fluid, and therefore the effective spring constant of these containers 40, can be individually variably controlled by adjusting the voltage between the electrodes 50 and 52 for each container 40.

The above disclosure sets forth a number of embodiments of the present invention. Other arrangements or embodiments, not precisely set forth, could be practiced under the teachings of the present invention and as set forth in the following claims.

I claim:

1. A robotic wrist adapted to permit relative motion between a first member and a second member, said robotic wrist comprising:
    a first end secured to said first member;
    a second end secured to said second member adjacent to said first end;
    at least one elastomeric container separating said first end from said second end, each of said containers holding an electro-rheological fluid; and
    means for selectively applying an electromagnetic field across said electro-rheological fluid within said elastomeric container, thereby selectively controlling the stiffness of said elastomeric containers by controlling the viscosity of said electro-rheological fluid within said elastomeric containers.

2. The robotic wrist of claim 1, wherein said elastomeric container has a substantially spherical shape.

3. The robotic wrist of claim 1, wherein said first end and said second end are substantially parallel with a common central axis extending substantially normal to both of said ends, and a plurality of said elastomeric containers are positioned in a radial arrangement about said central axis.

4. The robotic wrist of claim 1 wherein said elastomeric container and means for applying an electromagnetic field comprise:
    an elastomeric shell with an interior cavity adapted to contain a quantity of electro-rheological fluid;
    a first electrode extending within said interior cavity of said shell;
    a second electrode extending within said interior cavity of said shell; and
    a voltage source adapted to apply a voltage across said first electrode and said second electrode.

5. The robotic wrist of claim 4 wherein said first electrode comprises a conductive film deposited on a portion of the surface of said interior cavity.

6. The robotic wrist of claim 4 wherein said second electrode comprises a conductive member extending through said shell into said interior cavity.

7. The robotic wrist of claim 1 wherein said first and second ends extend substantially normal from a common central axis and said elastomeric containers comprise:
    a plurality of axial elastomeric containers separating said first end from said second end, adapted to constrain axial compression of said first and second ends;
    a plurality of radial elastomeric containers separating said first end from said second end, adapted to constrain relative radial movement between said first end and said second end.

8. The robotic wrist of claim 7 wherein said axial elastomeric containers are positioned in a radial arrangement about said central axis.

9. The robotic wrist of claim 8 wherein said axial elastomeric containers are positioned between said first end and said second end at a predetermined angle of inclination with respect to said central axis, such that the center of compliance of said wrist can be controlled by selectively controlling the stiffness of said axial elastomeric containers.

10. The robotic wrist of claim 9 wherein said angle of inclination is approximately 20 degrees.

11. A robotic wrist adapted to permit relative motion between a first member and a second member, said robotic wrist comprising:
    a first end secured to said first member, extending substantially normal to a central axis;
    a second end secured to said second member adjacent to said first end, said second end extending substantially normal to said central axis;
    a plurality of axial elastomeric containers separating said first end from said second end, each of said containers holding an electro-rheological fluid, adapted to constrain axial compression of said first and second ends;
    a plurality of radial elastomeric containers separating said first end from said second end, each of said containers holding an electro-rheological fluid, adapted to constrain relative radial movement between said first end and said second end; and
    means for selectively applying an electromagnetic field across said electro-rheological fluid within said elastomeric containers, thereby selectively controlling the axial and radial stiffnesses of said elastomeric containers by controlling the viscosity of said electro-rheological fluid within said elastomeric containers.

12. The robotic wrist of claim 11, wherein said elastomeric containers have a substantially spherical shape.

13. The robotic wrist of claim 11, wherein said axial elastomeric containers are positioned in a radial arrangement about said central axis.

14. The robotic wrist of claim 13 wherein said axial elastomeric containers are positioned between said first end and said second end at a predetermined angle of inclination with respect to said central axis, such that the center of compliance of said wrist can be controlled by selectively controlling the stiffness of said axial elastomeric containers.

15. The robotic wrist of claim 14 wherein said angle of inclination is approximately 20 degrees.

16. The robotic wrist of claim 11, wherein said elastomeric containers and means for applying an electromagnetic field comprise:
    an elastomeric shell with an interior cavity adapted to contain a quantity of electro-rheological fluid;
    a first electrode extending within said interior cavity of said shell;

a second electrode extending within said interior cavity of said shell; and a voltage source adapted to apply a voltage across said first electrode and said second electrode.

17. The robotic wrist of claim 16 wherein said first electrode comprises a conductive film deposited on a portion of the surface of said interior cavity.

18. The robotic wrist of claim 16 wherein said second electrode comprises a conductive member extending through said shell into said interior cavity.

19. A robotic wrist adapted to permit relative motion between a first member and a second member, said robotic wrist comprising:

a first end secured to said first member, extending substantially radially outward from a central axis, and having:
 (a) a plurality of first radial faces extending substantially parallel to said central axis; and
 (b) a plurality of first axial faces positioned in a radial arrangement about said central axis, each of said first axial faces being inclined at a small predetermined angle radially outward from said central axis;

a second end secured to said second member adjacent to said first end, said second end extending substantially normal to said central axis, and having:
 (a) a plurality of second radial faces extending substantially parallel to said central axis, each of said second radial faces being substantially in radial alignment with one of said first radial faces; and
 (b) a plurality of second axial faces positioned in a radial arrangement about said central axis; each of said second axial faces being inclined at a small predetermined angle radially inward to said central axis parallel to, and in alignment with one of said first axial faces;

a plurality of axial elastomeric containers, each separating one of said first axial faces from a corresponding one of said second axial faces, each of said containers holding an electro-rheological fluid, adapted to constrain axial compression of said first and second ends;

a plurality of radial elastomeric containers, each separating one of said first radial faces from a corresponding one of said second radial faces, each of said containers holding an electro-rheological fluid, adapted to constrain relative radial movement between said first end and said second end; and means for selectively applying an electromagnetic field across said electro-rheological fluid within said elastomeric containers, thereby selectively controlling the axial and radial stiffnesses of said elastomeric containers by controlling the viscosity of said electro-rheological fluid within said elastomeric containers.

20. The robotic wrist of claim 19 wherein said elastomeric containers and means for applying an electromagnetic field comprise:

an elastomeric shell with an interior cavity adapted to contain a quantity of electro-rheological fluid;

a first electrode extending within said interior cavity of said shell;

a second electrode extending within said interior cavity of said shell; and a voltage source adapted to apply a voltage across said first electrode and said second electrode.

21. The robotic wrist of claim 19 wherein said first electrode comprises a conductive film deposited on a portion of the surface of said interior cavity.

22. The robotic wrist of claim 19 wherein said second electrode comprises a conductive member extending through said shell into said interior cavity.

23. The robotic wrist of claim 19 wherein said angle of inclination is approximately 20 degrees.

24. The robotic wrist of claim 19 wherein at least one of said elastomeric containers has a substantially spherical shape.

* * * * *